April 30, 1963  D. ROSS  3,087,573
DAMPING STRUCTURE
Filed Aug. 10, 1959  2 Sheets-Sheet 1

INVENTOR
DONALD ROSS
By Rines and Rines
ATTORNEYS

April 30, 1963     D. ROSS     3,087,573
DAMPING STRUCTURE

Filed Aug. 10, 1959     2 Sheets-Sheet 2

INVENTOR
DONALD ROSS
By Rines and Rines
ATTORNEYS

United States Patent Office

3,087,573
Patented Apr. 30, 1963

3,087,573
DAMPING STRUCTURE
Donald Ross, Weston, Mass., assignor to Bolt Beranek & Newman, Inc., Cambridge, Mass., a corporation of Massachusetts
Filed Aug. 10, 1959, Ser. No. 832,644
10 Claims. (Cl. 181—33)

The present invention relates to damping structure and, more particularly, to structure that may be applied to vibratile or other bending surfaces to damp the motion thereof.

In copending application, Serial No. 811,191 of Edward M. Kerwin, Jr., filed May 5, 1959, and entitled "Apparatus For Damping," there is described what may be termed a "spaced damping-layer construction" for damping the vibration of flexural surfaces such as, for example, the metallic or other surfaces, panels or housings of vibration or noise producing equipment, or of the bodies of other parts of vehicles such as automotive, railroad and aircraft vehicles and the like, wherein a vibration-dissipative layer is subjected to shear forces in response to vibratory motion of a surface, with the amplitude of shear deformation amplified by a spacer mechanism, over that which would be produced by the vibrating surface alone. A wide variety of geometrical arrangements of the elements or spacers of the damping-layer construction and of the relative dimensions and proportions thereof can be employed, but it is not efficient from both cost and weight considerations to use larger-dimensional or heavier layers than are necessary to obtain substantially all the damping that it is practical to achieve. In accordance with the present invention, it has been discovered that there exists an optimal geometric and dimensional proportioning range which enables the use of minimal materials for substantially maximum damping.

An object of the present invention, therefore, is to provide a new and improved damping structure having optimal geometry or dimensional proportioning of its elements for obtaining most efficient maximal damping.

A further object is to provide a novel damping structure adapted to be applied generally to surfaces subject to vibration.

Other and further objects will be explained hereinafter and will be more particularly pointed out in the appended claims.

The invention will now be described in connection with the accompanying drawing, FIG. 1 of which is a longitudinally fragmentary section of a damping structure arranged and constructed in accordance with the present invention;

Figure 1:
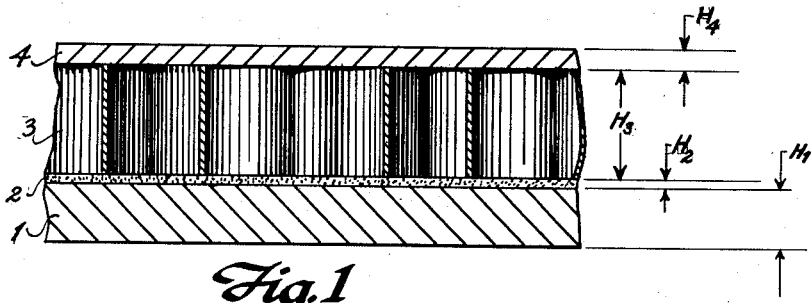

As described in the said copending application, a surface 1, the vibrations or motions of which are to be damped, may be covered with successively superposed layers of a dissipative material 2, a mechanically rigid spacer 3, and a constraining layer 4, to cause the dissipative layer 2 to become shear-deformed between the surface 1 and the combined members 3 and 4, as the surface 1 goes through mechanical bending, thereby to dissipate the bending energy as heat or the like, within the sheared layer 2. The term "surface" as employed herein is intended to connote not only flat or substantially planar members, but, also, curved surfaces, beams and other members subject to vibratory or other mechanical motion that is to be damped. The spacer member 3, as a result of its extension away from the surface 1 and in view of the constraining action of the layer 4, causes the upper surface of the dissipative layer 2 to deform in shear an amplified or greater amount than would have been the case if the constraining layer 4 were directly applied to the upper surface of the dissipative layer 2, as in the case of conventional "damping tape."

The dissipative layer 2 may be of any conventional damping-layer type, as set forth in the said copending application, though visco-elastic materials, such as, for example, filled high polymer plastic described by Oberst et al. in Akustische Beishefte (1954) Heft 1, AB 432–444, presently marketed under trademarks "Aquaplas" and "Schallschluck," are preferred. As described in the said copending application, such a damping layer has a complex shear modulus the magnitude of which is less than that of each of the surface-to-be-damped 1 and the constraining layer 4. Such a layer may adhesively secure itself to the surface 1 and to the lower surface of the spacer layer 3 and must have negligible extensional stiffness in order to perform as described. The spacer layer 3, such as, for example, a honeycomb construction as of rigid paperboard, plastic, metal, wood or other material, or a waffle-like member, strut construction or other rigid spacer, as described in the said application, is mechanically coupled between the upper surface of the dissipative layer 2 and the lower surface of the constraining layer 4, and, like the layer 2, should have negligible extensional stiffness in order to insure the amplified shearing action of the layer 2. The constraining layer 4, on the other hand, such as a relatively thin metal sheet or other layer, is of appreciable extensional stiffness, and it is rigidly cemented or otherwise secured to the upper surface of the spacer layer 3, thereby to maintain the deformation of the dissipative layer 2 a shear-force type of deformation.

In a second copending application of the said Edward M. Kerwin, Jr., Serial No. 812,521, filed May 11, 1959, for Damping Apparatus, it is explained that the properties of the damping material may be optimized to provide for maximum damping. The present invention, on the other hand, is concerned with the discovery, before mentioned, that the geometry and relative dimensions and proportions of all the elements 2, 3 and 4 of the damping apparatus may be optimized altogether apart from the optimizing of the damping material itself and irrespective of the Young's modulus or other properties of the damping and spacer layers. In practice, of course, it will in many cases be desirable to use both the optimum geometrical and proportional features of the present invention and the optimum damping-material feature of the said second copending application.

Specifically, the necessary geometrical proportioning of the elements 2, 3 and 4, relative to the surface 1 that is to be damped for obtaining this optional operation has been found to be determined substantially by the relationship $$Y=\frac{3e_4h_4(1+2[h_2+h_3]+h_4)^2}{(1+e_4h_4)(1+e_4h_4^3)} \quad (1)$$

where Y has an optimal range of from substantially 1 to substantially 5, with a maximum of substantially 3, and where $e_4$ is the ratio $E_4/E_1$ of the Young's modulus of the constraining layer 4 to that of the surface 1, $h_4$ is the ratio $H_4/H_1$ of the thickness of the constraining layer 4 to that of the surface 1, $h_2$ is the ratio $H_2/H_1$, and $h_3$ is the ratio $H_3/H_1$, where $H_2$ and $H_3$ are the respective thicknesses of the dissipative and spacer layers 2 and 3.

In the case of, for example, a steel or aluminum plate 1 and constraining layer 4, the former of which is about ¼ inch thick, a spacer layer 3 having a density one-tenth of that of the constraining layer 4, and a dissipative layer 2 of loss factor approximately unity, the following optimum values of $(H_2+H_3)$ and $H_4$ will produce maximal damping factors $\eta$ for values of Y within the above-stated range and for different percentages of weight of the damping treatment:

| Percent Wt. of Treatment | Opt. $(H_2+H_3)$, inches | Opt. $H_4$, inches | Y | $\eta$ |
|---|---|---|---|---|
| 15 | .200 | .017 | 1.5 | .185 |
| 20 | .300 | .020 | 2.7 | .26 |
| 25 | .375 | .025 | 4.2 | .32 |

Figure 2:
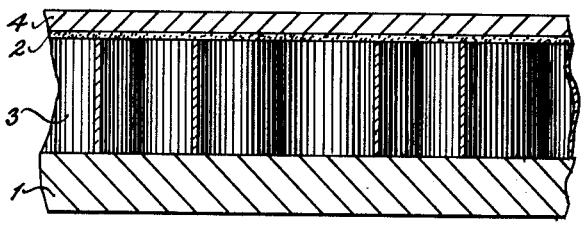
FIGS. 2, 4 and 5 are similar views of modifications.

As is also explained in the first-named copending application, the layers 2, 3, 4 do not have to be superimposed in the order of FIG. 1. A fully equivalent arrangement that performs the same way as the apparatus of FIG. 1 is illustrated in FIG. 2, wherein the spacer layer 3 is directly cemented or otherwise secured to the surface 1 and the dissipative layer 2 is applied between the upper surface of the spacer 3 and the constraining layer 4; the layers 2, 4 constituting, indeed, "damping tape," in a preferred version.

Figure 4:
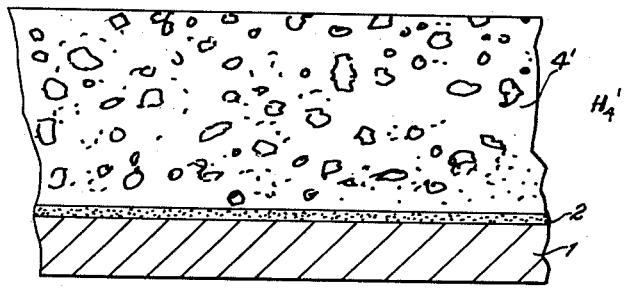

Not only may the arrangement of the elements be varied, but combinations of elements may, if desired, be effected. Thus, as is also set forth in the said first-named copending application, the functions of the spacer layer 3 and constraining layer 4 may be combined into a unitary spacer-and-constraining layer 4', FIG. 4, such as a foamed polyurethane or other plastic, or similar member. Equation (1), above, will then reduce to the expression:

$$Y=\frac{3e_4^1h_4^1(1+2h_2+h_4^1)^2}{(1+e_4^1h_4^1)(1+e_4^1h_4^3)} \quad (2)$$

where $e_3^1$ is the ratio $E_4^1/E_1$ of the effective Young's modulus of the unitary combined spacer-constraining layer 4' to that of the surface 1, and $h_4^1$ is the ratio $H_4^1/H_1$ of the effective thickness of the combined layer 4' to that of the surface 1.

Figure 3:
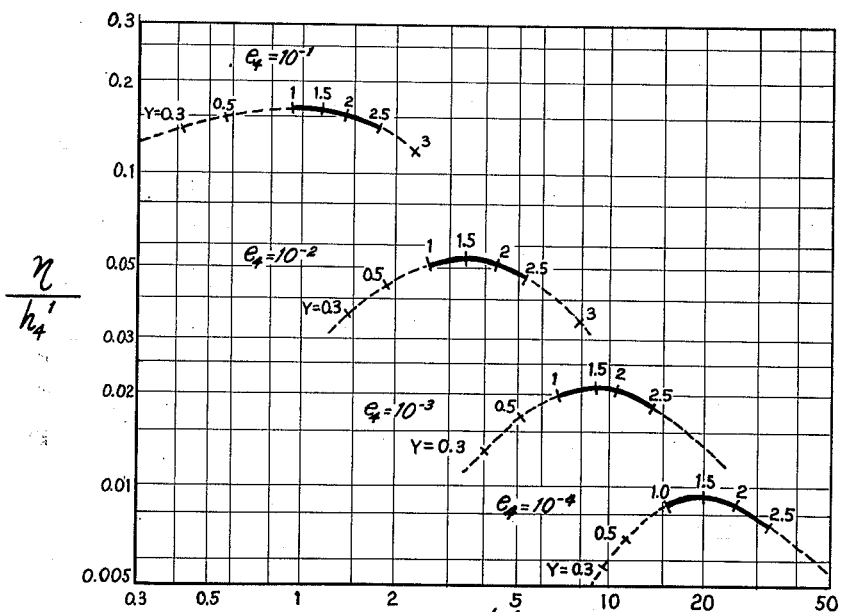
FIG. 3 is a graph illustrating the performance of the apparatus of FIG. 4.

The performance of such a structure, as plotted in FIG. 3, has been found to exhibit the same optimum range of ratio $\eta/h_4^1$ (plotted along the ordinate) as a function of $h_4^1$ (plotted along the abscissa) from substantially $Y=1$ to substantially $Y=2.5$, with a maximum obtained in the region of about $Y=1.5$, irrespective of the value of $e_4$, which is shown ranging from $10^{-1}$ to $10^{-4}$.

Typical examples of optimum-geometry structures of this type in the case of a ⅟₁₆ inch steel or aluminum plate 1, an optimum value $Y=1.5$, and a dissipative layer 2 of approximately unity loss factor, are as follows:

| $E_4^1/E_1$ | $H_4^1$ (inches) | $\eta$ |
|---|---|---|
| $10^{-1}$ | 0.075 | 0.185 |
| $10^{-2}$ | 0.218 | 0.185 |
| $10^{-3}$ | 0.55 | 0.185 |
| $10^{-4}$ | 1.25 | 0.185 |

Figure 5:
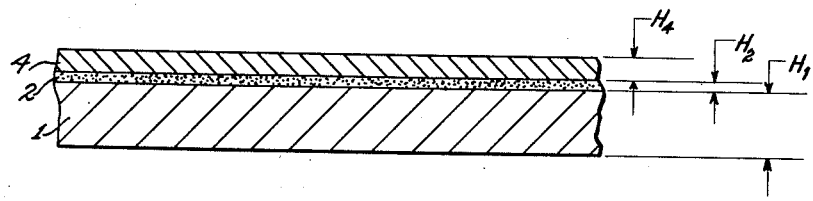

In the limiting case of FIGS. 1 and 2, moreover, where the spacer 3 is of negligible thickness ($h_3$ substantially zero) or wholly absent, as in the before-described "damping tape," FIG. 5, optimum values of constraining layer thickness $H_4$ within the optimal range of values of Y from about 1 to about 5 may similarly be determined from Equations (1) and (2). Thus, for a steel or aluminum plate 1 and constraining layer 4, the former of which is approximately ¼ inch thick, and a dissipative layer 2 of unity loss factor, the following optimum damping results may be obtained:

| $H_4$ (inches) | Y | $\eta$ |
|---|---|---|
| .085 | 1.5 | 0.19 |
| 0.112 | 2 | 0.22 |
| 0.175 | 3 | 0.275 |

Further modifications will occur to those skilled in the art and all such are considered to fall within the spirit and scope of the invention as defined in the appended claims.

What is claimed is:

1. In combination with a surface subject to flexural movements to be damped, a thin damping layer of mechanically extensible and contractable visco-elastic material secured to a mechanically stiff spacer much thicker than said layer, and a relatively inextensible shear-constraining layer, said damping layer, said spacer, and said shear-constraining layer being arranged generally parallel to said surface with said damping layer and said spacer secured between said surface and said shear-constraining layer, said shear-constraining layer causing said damping layer to shear in response to said movements, the shear stiffness of said spacer being substantially greater than that of said damping layer, said damping layer having a complex shear modulus substantially less than the shear modulus of said surface and said constraining layer, and the extensional stiffness of said spacer being substantially less than that of said surface and said constraining layer, said surface, damping layer, spacer, and shear-constraining layer being geometrically proportioned to satisfy the relationship:

$$Y=\frac{3e_4h_4(1+2[h_2+h_3]+h_4)^2}{(1+e_4h_4)(1+e_4h_4^3)}$$

where Y has a value of from substantially 1 to substantially 5, $e_4=E_4/E_1$, $h_2=H_2/H_1$, $h_3=H_3/H_1$, $h_4=H_4/H_1$ $H_1$ is the thickness of the surface, $E_1$ is the Young's modulus of the surface, $H_2$ is the thickness of the damping layer, $E_2$ is the Young's modulus of the damping layer, $H_3$ is the thickness of the spacer, $E_3$ is the Young's modulus of the spacer, $H_4$ is the thickness of the shear-constraining layer, and $E_4$ is the Young's modulus of the shear-constraining layer, whereby the mechanical energy losses in said damping layer are substantially greater than obtainable in the absence of said stiff spacer.

2. The invention of claim 1, wherein Y has a value of substantially 3.

3. The invention in claim 1, wherein said damping layer is disposed upon said surface, said spacer is disposed upon said damping layer, and said constraining layer is disposed upon said spacer.

4. The invention of claim 1, wherein said spacer is disposed upon said surface, said damping layer is disposed upon said spacer, and said constraining layer is disposed upon said damping layer.

5. The invention of claim 1, wherein said spacer and said constraining layer are combined into a unitary layer of effective thickness $H_4'$ and effective Young's modulus $E_4'$ dimensioned substantially to satisfy the relationship:

$$Y=\frac{3e_4'h_4'(1+2h_2+h_4')^2}{(1+e_4'h_4')(1+e_4'h_4'^3)}$$

where Y has a value of from substantially 1 to 2.5, and and
$$e_4' = E_4'/E_1$$
$$h_4' = H_4'/H_1$$

6. The invention of claim 5, wherein Y has a value of substantially 1.5.

7. The invention of claim 5, wherein said combined unitary layer is of foam material.

8. The invention of claim 1, wherein said spacer is a honeycomb structure.

9. The invention of claim 1, wherein the value of $h_3$ is substantially zero.

10. The invention of claim 9, wherein Y has a value of substantially 3.

References Cited in the file of this patent

UNITED STATES PATENTS

| | | |
|---|---|---|
| 2,069,413 | Leadbetter | Feb. 2, 1937 |
| 2,184,482 | Austin et al. | Dec. 26, 1939 |
| 2,192,516 | Cunnington | Mar. 5, 1940 |
| 2,278,733 | Peik | Apr. 7, 1942 |
| 2,450,911 | Park et al. | Oct. 12, 1948 |
| 2,477,852 | Bacon | Aug. 2, 1949 |
| 2,534,137 | Lewis | Dec. 12, 1950 |
| 2,609,068 | Pajak | Sept. 2, 1952 |
| 2,644,777 | Havens | July 7, 1953 |
| 2,744,042 | Pace | May 1, 1956 |
| 2,819,032 | Detrie et al. | Jan. 7, 1958 |
| 2,828,235 | Holland et al. | Mar. 25, 1958 |

FOREIGN PATENTS

| | | |
|---|---|---|
| 533,200 | Italy | March 1958 |